Patented June 25, 1935

2,005,984

UNITED STATES PATENT OFFICE 2,005,984

DEWAXING MINERAL OILS

Chester E. Adams and Vanderveer Voorhees, Hammond, Ind., assignors to Standard Oil Company, Chicago, Ill., a corporation of Indiana Application June 30, 1932, Serial No. 620,094

22 Claims. (Cl. 196—19)

This invention relates to the separation of wax from mineral oils and it pertains more particularly to the continuous filtration of wax from oil and to a method of washing the filter cake, maintaining high filter pressures, maintaining low filter temperatures, etc., in a closed filter chamber.

In order to separate wax from oil for obtaining low pour point lubricants, it has been the custom to dilute the wax bearing oil with naphtha, chill the diluted mixture to cause solidification of wax, and separate the solidified wax from the diluted oil by cold settling, filtering or centrifuging. Each of these mechanical separation methods has a drawback: the wax often settles very slowly, if at all, and occludes large volumes of oil; amorphous wax clogs the pores of filter elements and filtration is very costly, even when filter-aids are used to increase the filtration rate. Centrifugal methods require a high initial investment and large operating expense besides introducing other difficulties.

Recently the use of the liquefied gaseous hydrocarbons, e. g., propane, instead of naphtha, as a diluent has brought about a vast improvement in dewaxing methods. They cause the separation of wax in a more filterable form; they decrease specific gravity and the viscosity of the diluted oil; they facilitate economical, easily controllable refrigeration, and afford many other advantages. The object of our invention is further to increase the efficiency of a propane dewaxing system and particularly to provide a method and means for continuously filtering the wax slurry on an enclosed rotary filter so that it will be unnecessary to open filter presses or to operate closed filter presses batchwise.

The filtration of paraffin wax from suspension in liquefied gases on a continuous filter introduces many new problems not previously encountered in the filtration art. Propane dewaxing systems must be designed to operate under pressure and at extremely low temperatures and they must be gas-tight. It is impossible to use the ordinary rotary filter for propane dewaxing because such a filter uses reduced pressure for drawing the filtrate through the filter elements. With normally gaseous diluents such as propane, the use of a vacuum is practically impossible because it would evaporate the diluent. Also, it is difficult to maintain a large rotary filter at a lower temperature than that of the incoming wax slurry. This likewise tends to cause vaporization of the diluent. The vapor pressure of propane in oil is less than that of pure propane; consequently, when propane is used as a wash liquid there is a tendency toward disruption of the filter cake. It is difficult to insulate effectively large filters of this type and refrigerate the filter to abstract the heat which leaks in. The object of our invention is to overcome all of these difficulties and to provide a simple means for continuously filtering wax in an enclosed refrigerated rotary filter.

In practicing our invention we enclose the rotary filter in an insulated gas-tight pressure chamber. We obtain filtration by using a positive pressure between the outer casing and the filter instead of using a negative pressure on the filtrate outlet side. We prevent disruption of the filter cake by one or both of two expedients: We maintain a positive pressure by the injection of a light hydrocarbon, such as ethane, which vaporizes to refrigerate the filter chamber and which exerts a substantial and regulable pressure on the filter even at low temperatures and/or we use a cold wash liquid, such as butane, which has a vapor pressure lower than that of the diluent. When ethane is injected to maintain low temperatures at high pressures, it will be observed that it forms a gas which effectively drives all of the oil and diluent out of the filter cake before the filter cake is discharged. The ethane and/or butane is fractionally condensed or otherwise separated from the propane diluent in a suitable recovery system and the entire process may be continuously operated with practically no manipulation of valves.

The ethane employed in drying the filter cake may be liquefied and stored in that form, thus avoiding difficulties of recovery of solvents encountered when fixed gases are used.

In describing our invention we will refer to the diluent as propane, to the wash liquid as butane, and to the stripping gas as ethane. It should be understood, however, that this is by way of example only, as instead of propane we may use any liquefied normally gaseous diluent whether it is a halogenated light hydrocarbon, a normally gaseous ether, a normally gaseous amine, etc. The wash liquid should have a slightly lower vapor pressure than that of the diluent, and it may likewise be any volatile liquid of the types hereinabove referred to. The stripping gas, which is preferably introduced in liquefied form should have a higher vapor pressure than that of the diluent and it should be chemically inert. It may be any of the above-designated types of liquids or it may be an immiscible refrigerant such as carbon dioxide. We prefer, however, to use a substance which may be readily fractionated in the recovery system. We, therefore, prefer to use ethane, propane, and butane as above stated, or propane, butane and pentane, etc. We contemplate also the use of unsaturated hydrocarbons, the use of isobutane instead of butane, and other expedients which will be obvious to those skilled in the art. Our invention will be more clearly understood from the following detailed description and from the accompanying drawings which form a part of this specification and in which:

Figure 1:
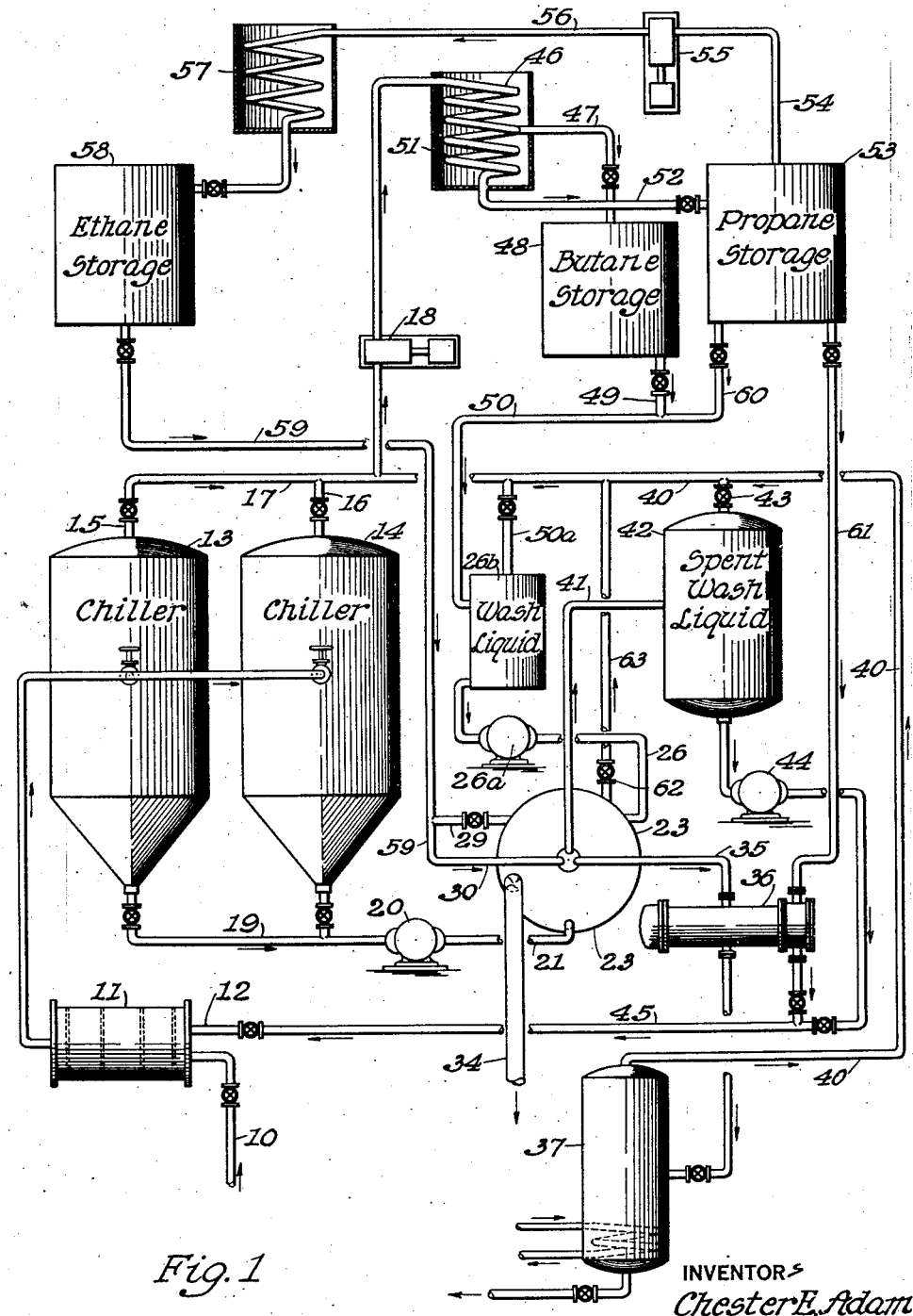
Fig. 1 is a diagrammatic elevation of our improved system.

In practicing our invention we will refer to the dewaxing of a treated overhead midcontinent lubricating distillate having a viscosity of about 120 seconds Saybolt at 210° F. It should be understood, however, that our invention is equally applicable to the dewaxing of any wax-bearing mineral oil, whether it is an overhead or residual stock and whether it is treated or untreated.

The wax-bearing oil is introduced from a suitable storage tank at a temperature of about 100° F. through pipe 10 to mixer 11, where it is mixed with about five volumes of propane from pipe 12. The mixture is then selectively introduced into chiller 13 or 14 which may be refrigerated in any suitable manner. We may use brine coils or direct expansion ammonia coils for this chill process, but we prefer to cool by evaporation of a part of the diluent, and we preferably chill the mixture at about 3° F. per minute by removing the propane vapors in regulated amounts through valves 15 or 16, and pipe 17 by compressor 18 which forces the gases to suitable condensers and fractionating means as will be hereinafter described.

Figure 2:
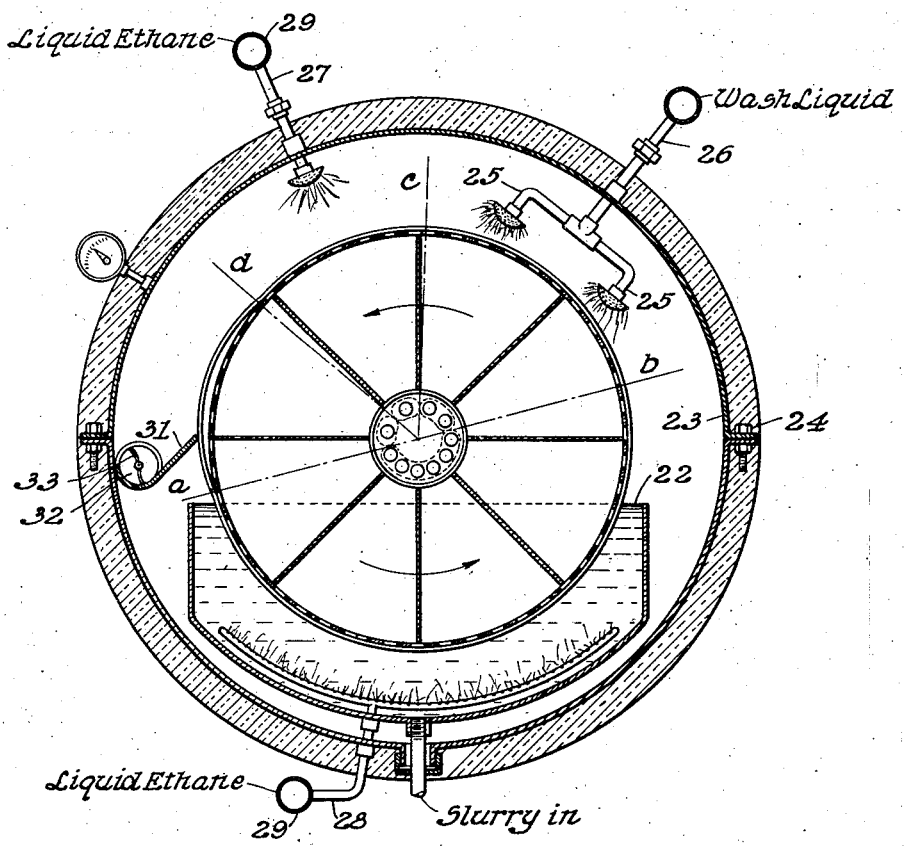
Fig. 2 is a vertical cross section, with parts diagrammatically indicated, showing the improved continuous rotary filter.

When the slurry has been chilled to about −40° F., it is withdrawn through pipe 19 by sliding vane pump 20 and passed by pipe 21 to pan 22 (see Fig. 2) in insulated filter casing 23 which is preferably made in a plurality of sections held together by bolts 24.

We prefer to use a continuous rotary filter of the disc type or the cylinder type. These filters per se are well known, they form no part of the present invention and they therefore will not be described in detail. It is sufficient to point out that if the cylinder shown in Fig. 2 operates in a counter-clockwise direction as shown by arrow, the filtration cycle will be about 180° from "a" to "b", the wash cycle will be about 70° from "b" to "c", the drying cycle will be about 50° from "c" to "d" and the blowback or filter cake discharge cycle will be about 60° from "d" to "a". In some cases it may be advisable to pre-coat the filter elements with filter-aid such as diatomaceous earth or wood flour subsequent to the removal of filter cake and prior to the immersion of the element in the body of slurry in pan 22.

The washing is effected by spraying liquid butane onto the cake by nozzles 25 which are connected by pipe 26 and pump 26A to the source of wash liquid, preferably cooled by expansion in chamber 26B. The drying is effected by forcing ethane or other suitable stripping gas through the washed filter cake, the ethane being introduced by pipe 27 adjacent the drying section or being introduced by pipe 28 into the bottom of pan 22 for agitating wax slurry and preventing wax crystals from settling out. The stripping gas is led to pipes 27 or 28 by pipe 29 (see Fig. 1) and gas from the same source is used as a blowback to discharge the filter cake by by-passing it through pipe 30. During the blow-back cycle the filter membrane is urged against scraper 31 which deflects the filter cake to trough 32 in which the spiral conveyor 33 acts to force wax cake out of the filter chamber through pipe 34 without releasing the pressure in said chamber.

The filtrate is transferred by pipe 35 through heat exchanger 36 to stripper 37 which is provided with suitable heating means such as steam coils 38. The finished oil is withdrawn through a pipe leading from the base of the stripper and vaporized diluent is passed by low pressure pipe 40 to compressor 18 which forces it through the fractionating and/or condensing systems.

The spent wash liquid, which may contain only small amounts of oil, is separately withdrawn by pipe 41 and introduced into receiver 42, where vapors which may be evolved are discharged by pipe 43 which is connected to low pressure line 40. The spent wash liquid may be disposed of in various ways, but in our preferred method it is forced by pump 44 through line 45 back to mixer 11 for admixture with further amounts of oil. The ethane and propane solution removed in the drying step are also transferred by pipe 41 to receiver 42, and since they flash at low temperatures, they assist in the refrigeration of the wash filtrate.

Propane, butane and ethane vapors from various sources are forced by compressor 18 to fractional condenser 46 from which liquid butane is trapped out and conducted by pipe 47 to butane storage tank 48. This butane may then be returned by pipe 49 and pipe 50 to expansion chamber 26B where butane vapors are discharged into gas line 40 by valved line 50A. This cools the remaining liquid. This liquid is then forced by pump 26A through line 26 to the spray nozzle in the filter chamber previously described, for washing further amounts of filter cake. Propane liquefied in remaining coils 51 of the condenser is passed through pipe 52 to propane storage tank 53. The propane will be accompanied by ethane both in solution and in gaseous form. The ethane vapors are removed through pipe 54 by a high stage compressor 55 and forced thereby through pipe 56 to condenser 57 and ethane storage tank 58. This condenser 57 is preferably cooled by cold filtrate or by liquid propane. From the storage tank 58 the ethane is led by pipe 59 to pipes 29, 28 and 27 or pipe 30. Propane from the storage tank 53 may be led by pipe 60 to the wash line 50 or it may be led by pipe 61 through heat exchanger 36 and used for diluting incoming oil. Heat exchanger 36 or some similar exchanger may likewise be used to liquefy the compressed ethane,—to cool condenser 57.

The operation of our improved apparatus will be apparent from the above description but certain features of the process and apparatus should be emphasized. In the first place, it will be noted that the ethane serves at least three or four separate and very important functions: It vaporizes in the filter chamber to provide the necessary refrigeration to maintain a low temperature; it provides the necessary pressure to prevent the undue vaporization of propane and the disruption of the filter cake; it provides a stripping or drying gas for removing oil and diluent from filter cake; it provides a blow-back material to facilitate the removal of the filter cake; and it provides a means for agitating the wax slurry to prevent the settling out of the wax crystals. The use of a butane wash liquid is not so important when ethane is used to maintain low temperatures and high pressures in the manner above stated, but it will be observed that butane or mixtures of butane with propane may be introduced through pipe 26 to wash the filter cake and to avoid any danger of disruption of the cake which might result from the use of a liquid having a higher vapor pressure than that of the diluent in the filter cake.

It should be noted that the diluent will contain a considerable amount of butane because we utilize wash liquid from receiver 42 for this purpose; however, this wash liquid is admixed with propane from pipe 61 and propane from storage tank 53 so that the diluent consists of the mixture of propane and butane while the wash liquid may be relatively pure butane or will at least contain more butane than is contained in the diluent. In other words, the butane is added to the diluent as wash liquid and the propane is added to the diluent directly.

While we have disclosed specifically a system for separating butane and propane and a high stage compressor for withdrawing ethane from the propane, it should be understood that we may use any suitable fractionating means for this purpose. It will also be understood that numerous valves, pressure and vacuum releases, pumps, heat exchangers, tanks, and other equipment may be used in our system in accordance with ordinary engineering practice. Particularly it should be noted that we employ a pressure release valve 62 connected to low pressure gas line 40 by pipe 63 so that if more gas is released by refrigeration than can be used in drying the cake, it may be properly vented, thus insuring a uniform low filter temperature. All refrigerated apparatus will of course be well heat insulated. The invention has been illustrated diagrammatically but we do not limit ourselves to any of the details above described except as defined by the following claims, which should be construed as broadly as the prior art will permit.

We claim:

1. The method of filtering a wax slurry to form a dry filter cake on a continuous rotary filter in a closed insulated chamber which comprises introducing a liquefied normally gaseous inert substance between said rotary filter and said chamber which vaporizes to effect refrigeration and to maintain filtering pressure and which consequently acts as a drying medium to remove liquids from the cake on the rotary filter.

2. The method of filtering a wax slurry on an enclosed continuous rotary filter which comprises introducing into said wax slurry a liquid having a lower boiling point than the temperature of the filter, whereby the wax slurry is agitated, a positive pressure is maintained on the rotary filter, and the liquid is stripped from the wax cake which is deposited on the filter.

3. The method of filtering and washing a wax slurry on an enclosed filter which comprises immersing the filter element in a wax slurry which is maintained under positive pressure whereby filtrate is forced through the element and a filter cake is built up thereon, and washing said filter cake with a liquid having a lower vapor pressure than the filtrate so that there will be no tendency for the filter cake to be disrupted by the expansion of wash liquid therein.

4. The method of continuously separating wax from a wax slurry on an enclosed rotary filter element which comprises immersing said element in a wax slurry under a pressure sufficient to force filtrate through the element and to build up a wax cake thereon, removing said filter cake from said slurry, washing said filter cake under a high pressure whereby disruption of the cake is prevented, drying said cake by means of a stripping gas, continuously removing said cake from said element and introducing a stripping medium between the filter element and the chamber for maintaining the said pressure and supplying said stripping gas.

5. The process of continuously separating wax from a chilled slurry of crystallized wax in oil diluted with a liquefied normally gaseous light hydrocarbon diluent by means of an enclosed continuous rotary filter which comprises passing said slurry consecutively through a filtration zone, a washing zone, a drying zone and a cake removal zone, blowing back a light hydrocarbon having a higher vapor pressure than the diluent to assist in removing filter cake in the cake removal zone and introducing said light hydrocarbon of higher vapor pressure in amounts sufficient to act as a stripping medium in said drying zone and to maintain a pressure for preventing disruption of filter cake in the washing zone.

6. The method of continuously filtering a wax slurry from an oil diluted with a liquefied normally gaseous diluent in an enclosed continuous filter which comprises introducing a stripping medium having a higher vapor pressure than that of the diluent, vaporizing the diluent, compressing said vaporized diluent together with said stripping medium, fractionating and separately collecting said diluent and said stripping medium for re-use.

7. The method of filtering a chilled slurry of solidified wax in oil diluted with a liquefied normally gaseous diluent in a closed continuous filter wherein a filter element passes through a filtering zone, a washing zone, a drying zone and a cake discharging zone, which comprises washing the filter cake with a spray of wash liquid, separately collecting the spent wash liquid, admixing said wash liquid with incoming oil to act as a diluent therefor, cooling said mixture to cause solidification of wax and produce a slurry of wax in oil and diluent, introducing said slurry into said filtering zone, introducing therein a liquid having a higher vapor pressure than that of the diluent, washing filter cake in the washing zone and recovering the spent wash liquid for re-use.

8. In a propane dewaxing system wherein solidified wax is separated from the diluted oil on an enclosed filter, the method of operating said filter which comprises using a wash liquid having a vapor pressure lower than that of propane and a drying medium having a vapor pressure higher than that of propane.

9. The method of claim 8 wherein the wash liquid is butane and the drying liquid is ethane.

10. The method of maintaining a filter chamber at low temperatures and high pressures which comprises introducing into said chamber a liquid having a boiling point lower than the desired temperature of the filter under the desired pressure and removing the vapors from said chamber in amounts sufficient to maintain said pressure and at the same time to permit enough of said liquid to evaporate to maintain said low temperature.

11. The method of removing oil from a filter cake wherein the oil is mixed with a diluent having a vapor pressure greater than atmospheric pressure which comprises washing said filter cake with a liquid having a vapor pressure lower than the vapor pressure of the diluent.

12. The method of operating a continuous closed pressure filter for separating wax from oil which comprises introducing into said filter a wax slurry diluted with a liquefied normally gaseous hydrocarbon, forming a filter cake on said filter, maintaining filtering pressure by introducing a lower boiling light hydrocarbon gas into said filter above said filter slurry, blending a light liquefied normally gaseous hydrocarbon with a heavier liquefied normally gaseous hydrocarbon, as compared with the diluent, to form a wash liquid, cooling said wash liquid by self-refrigeration, the amount of lighter liquefied normally gaseous hydrocarbon being sufficient to yield a cooled wash liquid of substantially the same vapor pressure as the diluent in the filter cake, introducing said cooled wash liquid into said filter, and separately removing wax and filtrate from said filter.

13. The method of operating a continuous closed pressure filter for separating wax from oil which comprises introducing into said filter a wax slurry diluted with a liquefied normally gaseous hydrocarbon consisting chiefly of propane, forming a filter cake on said filter, maintaining filtering pressure by introducing a pressuring fluid into said closed pressure filter, blending a plurality of liquefied normally gaseous hydrocarbons of different vapor pressures to form a wash liquid, cooling said wash liquid by auto-refrigeration whereby larger amounts of the lighter hydrocarbons are vaporized and the remaining cooled liquid has substantially the same vapor pressure as the diluent in the filter cake, introducing said cooled wash liquid into said filter for washing the filter cake, and separately recovering wax and filtrate from said filter.

14. A propane dewaxing process employing a continuous closed filter with filter elements therein, which process comprises diluting a wax-bearing oil with propane at an elevated temperature and pressure, chilling the diluted mixture to obtain a filterable wax slurry, transferring said slurry into said continuous closed filter, maintaining a supply of pressuring fluid, introducing a portion of said fluid from said supply to the space in said closed filter outside of said filter element to maintain filtering pressure, introducing another portion of said pressuring fluid to the inside of said filter element for assisting in the removal of filter cake, separately removing wax and filtrate from said filter, removing said pressuring fluid with said filtrate, removing propane and pressuring fluid from the filtrate, and removing the pressuring fluid from the propane.

15. In a dewaxing process employing at least two normally gaseous hydrocarbons of the class which consists of ethane, propane, isobutane and butane, the method of separating wax from diluted oil in a continuous closed pressure filter, which comprises introducing a slurry of wax in a solution of one of said hydrocarbons, introducing another of said hydrocarbons directly into said filter, separately removing wax cake and filtrate from said filter, distilling said hydrocarbons from said filtrate, fractionally condensing said hydrocarbons into higher molecular weight and lower molecular weight fractions, employing said higher molecular weight hydrocarbons for diluent and wash liquid, and employing said lower molecular weight hydrocarbons for pressuring gas in said filter.

16. The method of claim 4 wherein the wax slurry contains a substantial amount of propane.

17. The process of claim 5 wherein the liquefied normally gaseous light hydrocarbon is essentially propane.

18. The method of claim 6 wherein the liquefied normally gaseous diluent is essentially propane.

19. The method of claim 7 wherein the liquefied normally gaseous diluent is essentially propane.

20. The method of claim 10 wherein the filter contains a wax slurry in a diluent consisting essentially of propane and wherein the lower boiling liquid is a mixture of propane and ethane.

21. The method of claim 10 wherein the filter contains a propane-oil-wax slurry and wherein a mixture of propane and ethane is injected in said slurry to effect agitation thereof.

22. The process of claim 14 which includes the step of washing the filter cake with a cold wash liquid containing propane, recovering the wash liquid so used separately from the filtrate, and diluting a wax-bearing oil with the used wash propane in the first step of the process.

VANDERVEER VOORHEES.
CHESTER E. ADAMS.